INVENTOR.
GEORGE J. CARTER
BY Ford E. Smith
ATTORNEY

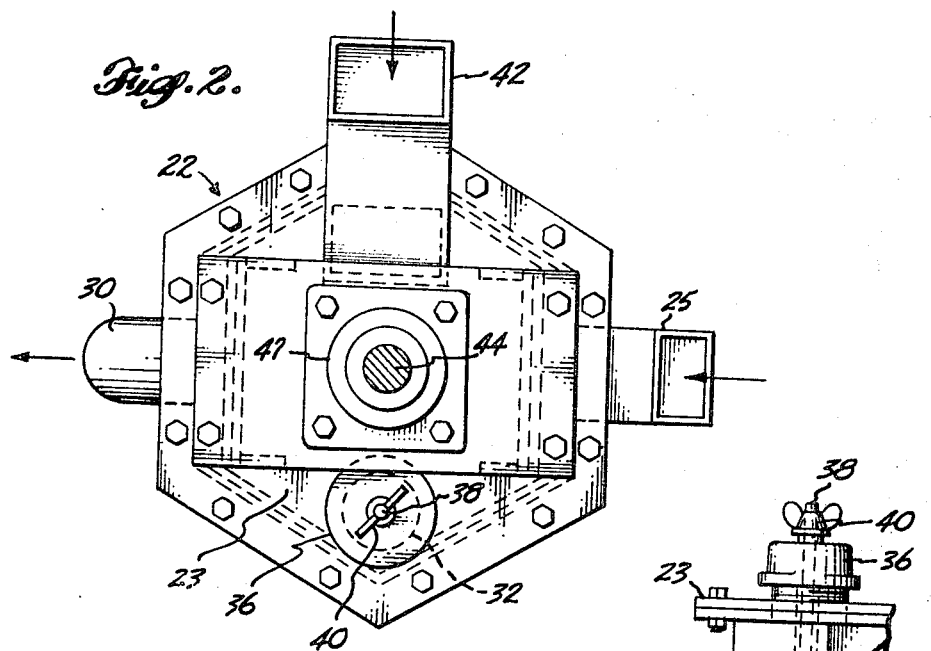
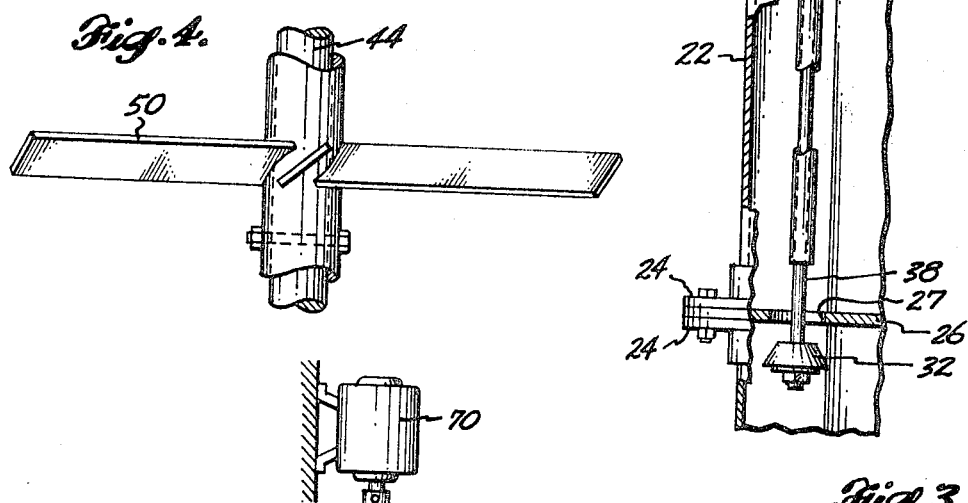
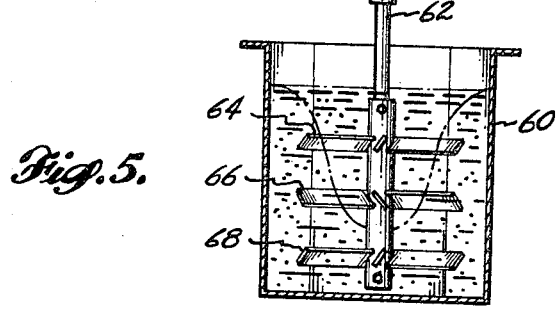

INVENTOR.
GEORGE J. CARTER
BY Ford E. Smith
ATTORNEY

United States Patent Office 3,446,442
Patented May 27, 1969

3,446,442
NONPERCUSSIVE VISCOUS-SHEAR MILLING PROCESS FOR PLATY MATERIALS
George J. Carter, 10202 20th Ave. NE.,
Seattle, Wash. 98135
Filed Jan. 3, 1967, Ser. No. 606,902
Int. Cl. B02c *1/00;* B02b */100, 5/02*
U.S. Cl. 241—15
11 Claims

ABSTRACT OF THE DISCLOSURE

The invention comprises feeding a three-component viscous slurry of platy material such as mica, granular grinding media and water into and through a disintegrating zone where the slurry viscosity is maintained at a nonsegregating level and is subjected to vigorous agitation and the solids to nonpercussive milling during retention in said zone for a predetermined time, usually about 2 and 10 minutes, during which shearing forces are applied on the mica involving rubbing, attrition and flexure, while avoiding the application of material percussive forces, whereby the mica in the slurry is reduced to extremely small particle sizes fully comparable to commonly known commercial wet-ground mica.

BACKGROUND

Natural mica occurs in the form of lustrous, cohesive, nonelastic, and flexible thin sheets arranged in blocks or books. These bodies are splittable along planes parallel to the natural cleavage of the mica crystal. Because mica is a soft nonmetallic mineral, one would believe it capable of being easily ground to extreme fineness. Such is not the case.

Mica is one of the more difficult minerals to grind. Particularly it has not been practical to suitably grind mica in a continuous manner that duplicates all of the characteristics of muller produced wet ground mica. Conventional and known grinding machines commonly used with other minerals have proved definitely unsatisfactory when used to process mica. Inherent toughness, nonelasticity and resiliency of mica are factors that have defeated prior attempts to continuously grind mica. Grinding has been slow and costly.

Dry ground mica is used in the roofing industry, in oil well muds, in plastic boards and for other non-discriminating uses, where torn and shredded mica particles and the low order of unctuousness and reflectance may be tolerated. Fine, dry ground mica includes particles that are shredded along the edges and have sheen and lubricity of a relatively low order. By comparison, wet ground mica, desirably about —325 mesh in particle size, is a very useful material in the rubber, paper and other surface coatings and paint industries. It is considered more desirable than the dry ground product because it has superior unctuousness, lubricity and slip, apparently only obtainable by wet grinding. The wet ground material is also more flaky and has higher reflectance and sheen and is preferably not torn or shredded at the particle edges. The current practice of producing wet ground mica is to employ muller processes which are generally very slow in operation, operate batchwise, and require a high power input per pound or ton of fine ground mica particles.

One other wet grinding process known to be continuous is more rapid than mulling but the ground mica does not evidence the sheen, slip and reflectance of muller ground mica.

Of the known wet grinding processes, it is believed that mica ground in a muller in the presence of water produces the most desirable product. Mulling mica requires ponderous equipment and is expensive, usually requires a five to eight hour grind, and production is at a rate of about five to seven pounds of finished product per horsepower hour. A wet grinding process is shown in the McDaniel Patent 2,547,336 in which a two-component slurry of water and mica, but including no grinding media, is continuously fed to a disintegrating zone where, under the influence of substantial back pressure of about 3–11 p.s.i., it is ground. McDaniel's process avoids impact from blades or hammers in the usual sense as in dry grinding. His two component feed is purposely nonfluid and has no flow characteristics. Such a grinding process is said to have an output of about 16.3 pounds of minus 325 mesh mica per horsepower hour.

In the related but not really analogous field of clay grinding, a process of wet grinding clay is disclosed in the Feld et al. Patent 3,075,710. There a three-component slurry of clay, grinding media and water is introduced into a disintegrating zone in a highly fluid, low viscosity state. It is subjected to violent agitation involving percussive forces of substantial magnitude. Feld's investigations on clay show only from 3.6 to 4.4 pounds of fine ground clay per horsepower hour have been produced. Though the patent states generally but does not disclose specifically that mica can be processed, it is not a practical or useful mica wet-grinding process. Primarily, the Feld et al. disclosure, indicates that the importance of viscosity control in the disintegrating zone has not been recognized. It appears that Feld et al. considered a high degree of fluidity desirable. Further, Feld et al. in their system teach only the movement of water and clay through the machine. The grinding media is retained at all times in the machine. The residence time in the grinding zone is given at 30 minutes.

Broadly, this disclosure teaches that the least possible fluidity of a three-component slurry and the continuous nonseparating movement of the slurry through a disintegration zone is most desirable and most efficiently obtains maximum production of wet ground mica at reasonable rates of power input. Residence time in the disintegrating zone must be predetermined as it depends primarily upon the characteristics of the feed material and the desired degree of particle size reduction.

DESCRIPTION OF THE INVENTION

Among the important objects of this invention are the provision: Of a practical and economical wet-grinding process for mica; of a process where mica is wet ground very rapidly with with minimal percussion; of a process requiring low power input by comparison with muller and other grinding processes; of a process rapidly producing a fine ground product suitably equal to muller-ground mica particles; of a continuous mica grinding process; of a process that may be practiced without requiring a high order of technical judgment, by persons of relatively low skill and not requiring substantial empiricism; of a process involving a constantly moving three-component slurry passing into and rapidly through and out of a disintegrating zone. These and other objects will become apparent in the following detailed description.

The principal factors of this wet-grinding system for mica are: the introduction and maintenance of a thick viscous nonseparating fully commingled three-component slurry; a continuous feed and withdrawal of all slurry components; and a brief and vigorous agitation of the slurry in a disintegrating or particle-reducing zone. Separation of the fine ground mica particles from the withdrawn slurry and return of oversize mica particles and grinding media to the system are related factors to continuity.

The slurry

The three-component slurry involves mica, grinding media and a liquid of which water is the most common liquid. The ratio of these components may be varied within ranges. Depending on the physical and chemical properties of the mica, a suitable deflocculent may be included in the slurry.

The nature and origin of the mica to be ground and of the grinding media may vary also. Scrap mica in the one-half inch to eighty mesh range is the usual and desirable feed material. This process has been satisfactorily practiced on a wide variety of micaceous materials including muscovite, sericite, biotite, and phlogophite. Work on which this disclosure is based was conducted specifically on the hard micas of the Black Hills of North Dakota; Black Warrior Petroleum Co. mica from Alabama; eastern Washington muscovite; and a hard scrap mica from India. Weathered or softer muscovites used have been from the Harris Clay Co., Kaolin and Gusher Knob plants in North Carolina; Feldspar Flotation mica from Connecticut; and a mica from a weathered granitic material of eastern Washington. Also grinding has been performed on a sericite mica from New Mexico; a phlogophite mica from eastern Canada; and biotite mica from central Idaho. It has also been used to grind mica-containing sand trap tailings obtained from a preconditioning operation on quartz-mica raw material.

This system can be shown to handle a wide size range of micaceous feed material. For example, India scrap was fed and milled at particle sizes up to six inches in plate dimensions. The sericite from New Mexico had a maximum size of 20 mesh. The other materials fell within this range but for the most part were finer than one-half to three-fourth inch.

Suitable grinding media comprise naturally rounded, quartz-sand particles; the mineral sands of zircon, garnet, corundum and the like; glass beads; and nonabrasive plastic grinding particles of which plastic polycarbonate granules (specifically "Lexan") and nylon pellets are typical examples. A suitable sand media is Ottawa sand of 20 to 48 mesh size having a specific gravity of about 2.65. The nylon grinding media found useful were granules about 0.15″ x 0.125″ x 0.08″ in size. The polycarbonate pellets were cylindrical in shape, had a diameter of $\frac{1}{10}″$ and a length of $\frac{1}{8}″$ and a specific gravity of 1.2. The specific gravity of the nylon was 1.15.

The particle size distribution of the grinding media materially effects reduction or disintegration of the mica component and is generally more effective than the factor of media density. While the quartz sand media appears to produce a higher percentage of minus 325 mesh mica particles, by comparison with the nonabrasive plastic media, it also left comparatively greater amounts of relatively unground mica than did either of the plastic grinding granules or pellets.

The plastic grinding media easily produces suitable mica particle size reduction. Because it is nonabrasive, surface scratching and marring of the mica plates or flakes is avoided, equipment life is prolonged, and power requirements are reduced, all as compared with sand grinding media. The hardness and density of the grinding media are not vital factors in this process where mass is not essential.

A problem inherent in a wet system, where the slurry is of low viscosity and rotary agitating means is employed, is the great amount of percussion and undesirable abrasion to the mica and the equipment by an abrasive media. Impaction produces excessive scratching and marring of the particles, and fails to produce mica particles having the desired unctuousness, lubricity, slip and reflectance. Absent these characteristics the ground product is described as "dead" and is undesirable for applications where wet ground mica is required or specified.

Whatever the grinding media, the high viscosity of the slurry in this system maintains constant contact between the media and the mica during processing. The slurry in this process is nonseparating in the disintegration zone. This means that therein at all times there is maintained intimate contact between the solid components of the slurry. The water content is such that the slurry has fluid flow under agitation but is insufficient to permit settling or separation when not agitated. By maintaining this nonseparating condition a high-energy trasfer efficiency is obtained and percussive milling minimized. This condition restricts the application of forces to interaction of the slurry solids with appropriately desirable results. The high energy transfer is clearly evidenced by an initial rapid temperature rise approximately the boiling point of water as shown by the evolvement of water vapor or steaming of the slurry.

The important factors regarding grinding media are the size range of the media particles and the ratio of media to mica slurry. But the most important factor in this process is the careful control of the viscosity or fluidity of the system while disintegration is taking place. This control is in part exercised in forming the three-component slurry for feeding into the distintegrator and in part by adjustments made during disintegration.

A phenomenon of mica grinding is that even though the mixed mica and grinding media solids to be fed are only wet enough to produce good initiation, shortly after being subjected to attrition in the milling equipment, the slurry has appreciably decreased in viscosity or increased in fluidity. Generally, this increased fluidity requires either that liquid be removed or more solids be added. The effect of this phenomenon on the particle reduction is observable by sampling which has revealed that as viscosity decreases so also does the amount of mica fines being produced decrease for any given period of time. In other words as fluidity increased effective attrition of the mica decreases. This effect is probably best counteracted by the addition of mica or media solids to the system but it may also be accomplished by drawing off liquid.

It is believed this phenomenon occurs because the initial mica-media mix is composed of large voids which must be filled with liquid to produce initial flow. As attrition takes place and the mica feed particles are reduced in size the voids in the mass between the mica and the media become less and the available liquid becomes excessive to such extent that the slurry has greater flow than initially. When the feed contains mica of a fineness to fill the voids in the grinding media, the slurry did not so rapidly become excessively fluid.

In the practice of viscosity or fluid flow control it is desirable that the slurry be maintained at such a low fluidity that the solids be nonseparating in the disintegration zone. In other words the slurry, as to all three components, should be maintained at such a stiff level that there is no puddling or separation of liquid as when a slurry sample under milling is allowed to come to rest.

It is apparent from the preceding paragraphs that there are a number of variables that must be considered in determining the residence time of a given material in the disintegrating zone of the apparatus, the most important of which are the desired degree of particle size reduction and the characteristics of the feed material. Naturally, coarse grinding (minus 100 mesh) requires less time than fine grinding (minus 325 mesh); also, soft or weathered mica disintegrates more rapidly than the hard varieties of muscovite, especially those having large particle dimensions. Another factor to consider, as will be explained in detail in the following examples, is the choice of grinding media and the selection of its particle size distribution.

In applying viscous-shear milling to the continuous wet grinding mica, a balance must be maintained to avoid overgrinding or undergrinding. Overgrinding—too long a residence time—produces an excessive amount of colloidal fines, a large portion of which must be discarded. Associated with undergrinding—too short a residence time— are low production of ground mica product and high recirculating loads. For most of the materials tested, residence time in the disintegration zone ranged from 2 to 10 minutes; however, the fine grinding of a few of the hard muscovite samples required residence times of up to 30 minutes in order to maintain a reasonably low recirculating load of unground mica.

In the accompanying drawings is shown suitable milling equipment for practicing this invention, as follows:

FIGURE 2 is a cross-section of line 2—2 of FIGURE 1;

FIGURE 3 is a detail view of a control valve between the superposed chambers;

FIGURE 4 is a side view of a portion of a bladed agitator;

FIGURE 5 is a vertical sectional view of alternate milling apparatus; and

Figure 1:
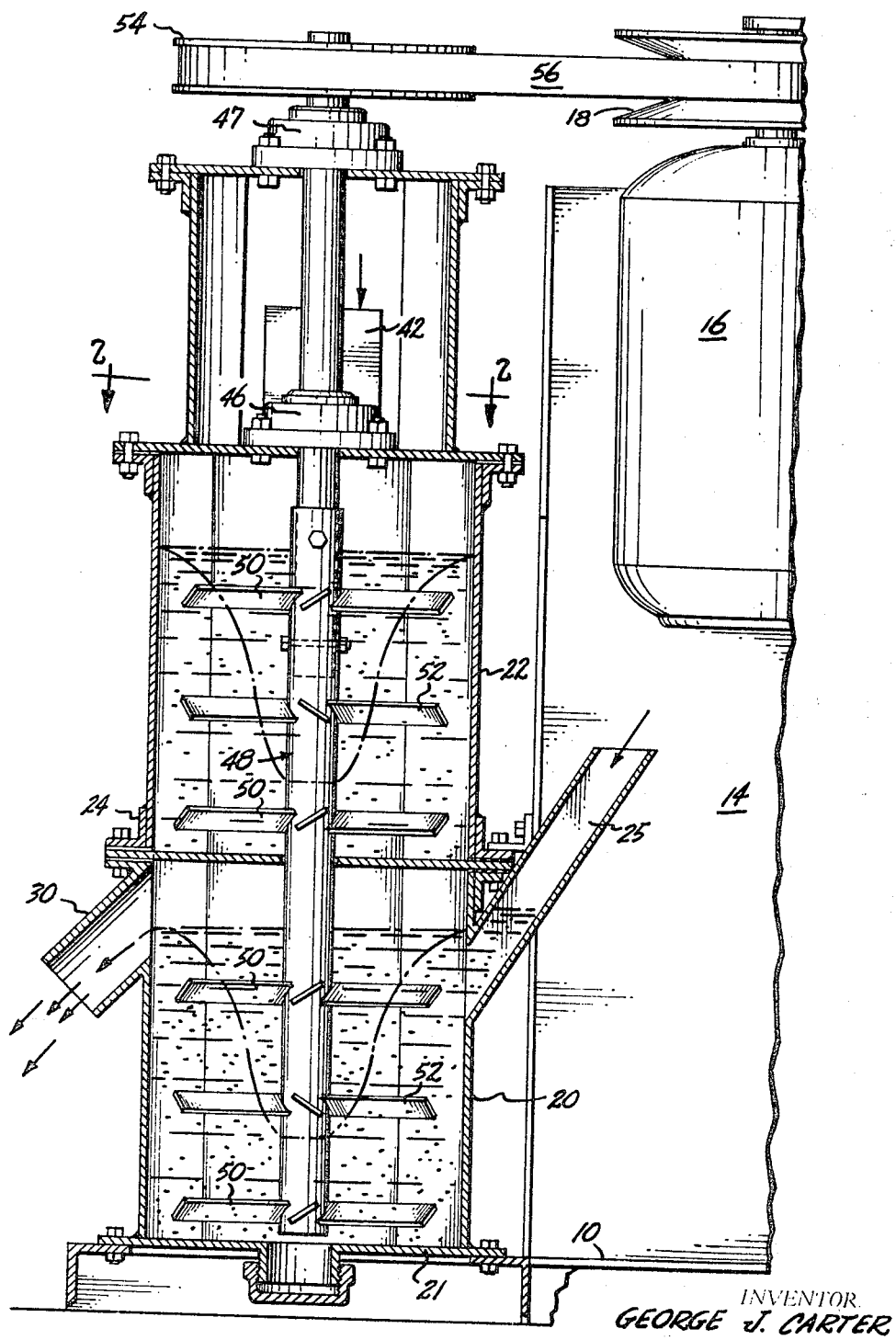
FIGURE 1 is a vertical sectional view of a milling machine having superposed disintegrating chambers each enclosing rotary agitation means.

The milling machine comprises a base 10 including upright frame 14 which supports motor 16 having a drive sheave 18.

The mill includes lower vessel 20 and upper vessel 22 mounted thereover by joinder of flanges 24 to a divider plate 26. Vessel 20 is closed at the bottom by plate 21, vessel 22 is closed by cover plate 23. Opening 27 in plate 26 affords a passage between the chambers of vessels 20 and 22. Preferably the chambers within vessels 20 and 22 are polygonal as shown in FIGURE 2.

Vessel 20 has an overflow outlet 30 at one upper side and a feed inlet hopper 25. Valve 32 carried by rod 34 is disposed at the underside of opening 27 in the chamber of lower vessel 20. It will be noted that rod 34 is located in a V of the polygon of the upper vessel 22 and passes upward through plate 23 and cap 36. Threads 38 on rod 34 and thumbnut 40 engaged thereon permit vertical adjustment of valve 32 relative passage 27.

Slurry is fed to upper vessel 22 through hopper 42 and to lower vessel 20 through hopper 25.

Shaft 44, journalled in bearings 46, 47, depends into vessel 22 and is there coupled to agitator shaft 48, which extends downward through both vessels 22 and 20 and carries radial blade impellers 50 and 52 which are similar to each other except that the pitch of the blades are oppositely arranged as shown in FIGURE 1. Drive belt 56 encircles motor sheave 18 and sheave 54 on shaft 44.

The mill is operated by feeding slurry through hopper 42 into the upper chamber in vessel 22. Rotation of the bladed agitators provides vigorous agitation and intimate commingling of the slurry components to maintain the same nonsegregating with resultant mica attrition. The fluid-flowable slurry easily and rapidly moves through passage 27 into the lower chamber at a rate governed by the setting of valve 32. The agitators causes the slurry in each vessel to assume a vortical shape as indicated. The residence time of the slurry in both chambers constituting the disintegration zone is for a predetermined period of time depending upon the characteristics of the feed and the desired degree of particle size reduced, usually about 2 to 10 minutes.

As will be more fully explained later, there is usually a rapid initial decrease in the viscosity of the feed material. This increased fluidity is counteracted by introducing more solids into the system to maintain a desirably low fluidity and high viscosity to insure that milling forces are primarily only of the nature of viscous shear, flexural and frictional with little or no percussion or impact. To accomplish this adjustment auxiliary solids are introduced into the system in the lower vessel 20 through hopper 25. Or depending on the through-put rate, they may also be introduced to the upper vessel along with the normal feed material.

As the feed continues there is an overflow and discharge from the lower chamber through spout 30. The withdrawn portion of the slurry passing through spout 30 is continuously classified by conventional equipment and the oversize part thereof including grinding media may be dewatered and returned to the feed end of the operation either as common feed or adjustment feed for viscosity control.

It will be noted that the grouped impellers in each of the chambers are disposed more in the bottoms of the chambers than throughout the chambers. This affords more effective agitation of the vortical shaped slurry and improves the rate of mica particle reduction.

The alternating arrangement of the pitch of the impellers 50 and 52 produces increased vortical activity within the slurry and insures thorough and intimate commingling all slurry components. The agitated and intimately commingled slurry and the interaction between the solids produces the shear forces which cause mica delamination and the flexural forces which cause the delaminated mica flakes to distintegrate into smaller and smaller sizes. At the same time there is a rubbing and polishing action which removes any frayed particles and insures the retention of the natural high luster of the mica. The low order of any percussive forces minimizes scratching and marring or fraying of the mica in this very viscous material under agitation.

The disintegrating zone is the area within the apparatus occupied by the slurry mass, vortically shaped during grinding as mentioned, under high rotary agitation. Disintegration of the mica occurs within that slurry mass primarily from the interaction of the fully commingled solids particles and results from the forces of shear, abrasion and flexure present within the agitated mass. The function of the impellers is to impart motion to the mass and little or no disintegration of the mica occurs from contact with the impeller blades. In the apparatus of FIGURES 1–4, the disintegrating zone is in part in upper vessel 22 and in part in lower vessel 20. In the upper vessel disintegration is initiated, viscosity adjustments are made, and some grinding occurs. Passage of the slurry from the upper to the lower vessel places the properly fluid mica and grinding media in a final disintegrating zone where the principal grinding takes place.

In FIGURE 5 a six-sided vessel 60 was used for batch grinding mica in a media-water slurry for test purposes. Agitation was supplied from rotary shaft 62 coupled to motor 70 on which a plurality of bladed impellers 64, 66, 68 was mounted. In operation at 1700 r.p.m. the slurry had a deep vortical cavity, as indicated by dotted lines, not quite exposing the lowermost impeller at a desirable viscosity. Mixing and conditioning of the slurry was enhanced by the shape of the container. Infolding of the slurry was particularly noted and is considered advantageous.

It will be understood that the agitation equipment is typical of that used for laboratory exploration of the many aspects of the process. For continuous operation it would necessarily be supplemented by mixing and feeding apparatus adapted to provide a desired rate of feed at predetermined viscosity. Likewise, with respect to a continuous discharge of the ground slurry, the withdrawn material will be processed through separation apparatus where the desirably fine particle portion is separated from the grinding media and the oversize portion, the latter being recycled into the system either as part of the main feed or as adjustment feed in the second chamber of the disintegration zone.

In order to expand the disclosure, there are set forth in the following numerous examples and tables based on work with the process. Numerous variables have been explored and are recorded and, as well, studies have been made and are reported concerning grinding efficiency at various viscosities, the nature of recirculating loads under various conditions, effects of particle size in the feed and bulk density of various materials being fed, grinding actions of a variety of grinding media, and the like.

Full details are set forth in the following examples:

Example 1

An apparatus similar to that shown in FIGURE 5, with an internal minimum dimension of 4½ inches, was used to grind a variety of scrap micas on a batchwise basis. The mica used in this test was minus 10 mesh muscovite scrap from the Feldspar Flotation operation in Connecticut. The grinding charge had the following composition:

TABLE A

| Sample | C1 | | C2 | |
|---|---|---|---|---|
| | Weight, grams | Volume, percent | Weight, grams | Volume, percent |
| Media [1] | 350 | 42.8 | 750 | 42.0 |
| Mica | 250 | 13.1 | 250 | 13.2 |
| Water | 300 | 44.1 | 300 | 44.8 |
| Total | | 100.0 | | 100.0 |

[1] The media for test C1 was Lexan polycarbonate cylinders ⅒″ diameter x ⅛″, and for test C2 20 to 48 mesh Ottawa sand.

The procedure used to insure fluidity throughout the duration of the experiment was to charge the grinding apparatus with about ¾ of the solids and most of the liquid. Impeller rotation was initiated, and the rotor lowered gradually into the grinding charge while rotating at a peripheral speed of about 1950 f.p.m. Additional water was added, as needed, to make the mix fluid. The balance of the solids was added gradually during the first minute of operation. The run was continued for a total elapsed time of five minutes and the apparatus stopped. The grinding charge was then removed from the grinder and separated by washing and wet screening.

The size distribution of the ground products was obtained by a combination of wet and dry screening and sedimentation to determine the amount of minus 4 micron material. Results of the size analyses are as follows:

TABLE B

| Particle sizes determined | Feed material, percent | Ground mica, percent | |
|---|---|---|---|
| | | C1 | C2 |
| Plus 35 mesh | 47.0 | 4.4 | 12.1 |
| 35 to 100 mesh | 44.8 | 15.1 | 7.6 |
| 100 to 200 mesh | 6.3 | 26.5 | 17.4 |
| 200 to 325 mesh | 1.0 | 15.1 | 13.0 |
| 325 mesh to 4 microns | 0.9 | 33.5 | 42.3 |
| Minus 4 microns | | 5.4 | 7.6 |

At present, suppliers of wet ground mica only guarantee their product to be minus 100 mesh. They also discard a large percentage of the fraction finer than 4 microns because this fraction usually contains a high percentage of clay impurity. Therefore, the amount of wet ground mica recoverable as potential products is as follows:

TABLE C

| | Sample C1, percent | Sample C2, percent |
|---|---|---|
| Minus 100 mesh | 75.1 | 72.7 |
| Minus 200 mesh | 48.6 | 55.3 |
| Minus 325 mesh | 33.1 | 42.3 |

From these data, two factors are apparent, size reduction of the mica is considerable, and the mica ground with the coarser media had a coarser particle size distribution. Examination of the ground products indicated that the fractions of both samples were of equal quality. The brightness, sheen, and lubricity of the ground mica was equivalent to or exceeded that of a commercial wet ground mica used as a standard for comparison.

The principal advantages of this method over the conventional muller process, and those previously proposed, such as the McDaniel process of Patent No. 2,547,336, is its combination of relatively high grinding efficiency with a high ratio of product recovery. As can be seen from the above data, the recirculating load of mica or regrinding at 100 mesh would only be 33 percent; at 200 mesh, 82 percent; and at 325 mesh, 135 percent. The production of minus 325 mesh mica per horsepower hour was 11.2 pounds. The advantage of the combination of high efficiency and high recovery can be seen from the tests shown in the following example.

Example 2

Using the same apparatus, and following the procedure set forth in Example 1, comparative grinding tests were run to evaluate the effect of grinding with and without media. Mica from three different origins was used in these tests; one, a minus 20 mesh sericite from New Mexico; two, a minus 10 mesh muscovite mica flotation concentrate from Connecticut; and three, a minus 8 mesh muscovite mica spiral concentrate from a clay mining operation in North Carolina. The composition of the grinding charges is as follows:

TABLE D

| Sample | Media [1] | | Mica | | Water | |
|---|---|---|---|---|---|---|
| | Wgt. | Vol. percent | Wgt. | Vol. percent | Cc. | Vol. percent |
| S5-1 | 750 | 49.4 | 250 | 15.6 | 200 | 35.0 |
| S9-1 | | | 750 | 44.0 | 340 | 56.0 |
| C2 | 750 | 42.0 | 250 | 13.2 | 300 | 44.8 |
| C3 | | | 750 | 26.4 | 750 | 73.6 |
| K1 | 750 | 43.7 | 250 | 13.8 | 275 | 42.5 |
| K2 | | | 750 | 27.7 | 700 | 72.3 |

[1] 20 to 48 mesh Ottawa sand.

After grinding for a total of five to eight minutes the grinder was stopped and the ground mica evaluated by wet screening at 325 mesh. Grinding efficiency and the volume of the recirculating mica were calculated. These data are as follows:

TABLE E

| Test No. | Retention time, minutes | Recovery, percent minus 325 mesh | Efficiency, pounds per horsepower hr. | Recirculating load, percent |
|---|---|---|---|---|
| S5-1 | 5 | 47.6 | 12.6 | 110 |
| S9 [1] | 5 | 15.3 | 12.1 | 550 |
| C2 | 5 | 42.3 | 11.2 | 135 |
| C3 [1] | 7 | 20.0 | 11.3 | 400 |
| K1 | 5 | 49.2 | 13.0 | 103 |
| K2 [1] | 8 | 25.3 | 12.6 | 295 |

[1] No media used.

Although the grinding efficiency with and without grinding media is approximately equal, the inclusion of media in the grinding slurry is definitely beneficial. The recirculating load of unground mica is greatly reduced, materially simplifying the problems of absolute control of the water content of the grinder feed. Another benefit is that the grinding slurry containing media is much denser and had better flow characteristics and, therefore, was more easily processed.

Note should also be taken in Table C of the very large differences in the required water content necessary to produce fluidity in the muscovite containing slurries (C2 and C3, K1 and K2) as compared with sericite containing slurry (S5-1 and S9). This is due to the difference in density of the micaceous materials, although the sericite was finer in particle size it was more book-like in structure and therefore required less water.

Example 3

In order to demonstrate the effect of variations of the water content on recovery and grinding efficiency, four controlled series of test were conducted on slurries of varying mica to media ratios. The mica used in these tests was minus 20 mesh sericite from New Mexico and the apparatus and procedure used was the same as described in Example 1. Composition of the grinding charges and date on the recovery and grinding efficiency are as follows:

Table G. These tests were conducted in a similar manner and using the same materials as used in Example 3. The

TABLE F

| Sample [1] No. | Media [2] Wgt., grams | Media [2] Vol., percent | Mica Wgt., grams | Mica Vol., percent | Water Vol., cc. | Water Vol., percent | Recovery, percent −325 mesh | Grinding efficiency, lbs. per HP hr |
|---|---|---|---|---|---|---|---|---|
| S2-1 | 925 | 57.6 | 125 | 7.4 | 212 | 35.0 | 67.2 | 8.9 |
| S2-2 | 925 | 56.7 | 125 | 7.3 | 220 | 36.0 | 58.4 | 7.7 |
| S2-3 | 925 | 55.8 | 125 | 7.2 | 230 | 37.0 | 53.3 | 7.1 |
| S3-1 | 750 | 56.0 | 125 | 9.2 | 175 | 34.8 | 60.0 | 7.9 |
| S3-2 | 750 | 54.8 | 125 | 9.0 | 187 | 36.2 | 56.0 | 7.4 |
| S3-3 | 750 | 51.5 | 125 | 8.5 | 220 | 40.0 | 50.3 | 6.6 |
| S3-4 | 750 | 47.2 | 125 | 7.8 | 265 | 45.0 | 43.1 | 5.7 |
| S4-1 | 750 | 53.0 | 185 | 12.6 | 180 | 34.4 | 57.6 | 11.3 |
| S4-2 | 750 | 52.5 | 185 | 12.3 | 190 | 35.2 | 53.2 | 10.4 |
| S4-3 | 750 | 48.8 | 185 | 11.4 | 230 | 39.8 | 46.5 | 9.1 |
| S4-4 | 750 | 44.5 | 184 | 10.4 | 270 | 45.1 | 39.2 | 7.7 |
| S5-1 | 750 | 49.4 | 250 | 15.6 | 200 | 35.0 | 47.6 | 12.6 |
| S5-2 | 750 | 45.4 | 250 | 14.4 | 250 | 40.2 | 38.8 | 10.3 |
| S5-3 | 750 | 42.0 | 250 | 13.2 | 300 | 44.8 | 32.2 | 8.5 |

[1] All tests, 5 minutes in duration.
[2] 20 to 48 mesh Ottawa sand.

It will be noted from Table F that as the volume percent water, in any of the several slurries, of given media/mica ratio, increases there is a corresponding decrease in the amounts of minus 325 mesh mica particles recovered. Samples S2-1, S3-1, S4-1, and S5-1, represent the minimum water content of each slurry that had fluid flow, whereas other samples in each series, S2-2, S2-3, etc., represent slurries of increased water content. At water contents higher than those shown in Table F. the flurries became excessively fluid, and could not be confined within the grinding apparatus. The advantage of keeping the water content to a minimum that allows fluid flow is shown by the higher grinding efficiencies of the lower water content slurries.

The minus 325 mesh mica, recovered as in Table F, met the requirements of wet-ground mica as used in industry, as long as the fluidity of the grinding charge was maintained. A mica sample collected from a preliminary run in which the water content of the charge was too low to allow fluid flow was "dead" in appearance. Mica collected from a very fluid slurry also showed a loss in brightness, but not as marked as that from the non-fluid charge.

Example 4

It may appear, from the data shown in Table F, that as the media/mica ratio decreased grinding efficiency increased. However, these data points represent only a very narrow range of compositions. To fully evaluate the effect of the media/mica ratio on grinding efficiency the range of grinding compositions was expanded as shown in water content of each of the grinding compositions was the minimum that would allow fluid flow.

TABLE G

| Sample No. | Media Weight grams | Media Volume, percent | Mica Weight, grams | Mica Volume, percent | Water Volume, cc. | Water Volume, percent |
|---|---|---|---|---|---|---|
| S2-1 | 925 | 57.6 | 125 | 7.4 | 212 | 35.0 |
| S3-1 | 750 | 56.0 | 125 | 9.2 | 175 | 34.8 |
| S4-1 | 750 | 53.0 | 185 | 12.6 | 180 | 34.4 |
| S5-1 | 750 | 49.4 | 250 | 15.6 | 200 | 35.0 |
| S6 | 750 | 42.3 | 350 | 18.7 | 265 | 39.0 |
| S7 | 750 | 35.9 | 500 | 22.6 | 325 | 41.5 |
| S8 | 750 | 28.3 | 750 | 26.7 | 450 | 45.0 |
| S9 | | | 750 | 44.0 | 340 | 56.0 |

The volume of the agitated slurry remained essentially constant with decreasing media/mica ratios, through sample S5-1. However, further decrease in this ratio was accompanied by a marked and increasing volume expansion of the slurry components (S6 thru S9). This expansion was much greater than can be accounted for by the increased weights of the grinding charge. For example sample S5-1 which weighed one fourth more than the 100 percent mica slurry, sample S9 occupied much less volume in the grinding apparatus. In addition the slurries containing the higher mica contents, especially the 100 percent mica slurry, were very light, and difficulty was experienced in maintaining fluid flow. Slurry S9 tended to develop air pockets that interrupted the circulation of the slurry in the disintegration zone.

For a given continuous grinding apparatus, a more voluminous grinding charge for equal residence time in the grinding apparatus requires a slower feed rate. Therefore, in order to get a true evaluation of the grinding efficiency it was necessary to compensate for the differences in volume of the various slurries. This was accomplished by correcting the samples to equal volume based on the minimum water content required to maintain fluid flow. Results of these tests are as follows:

TABLE H

| Sample No. | Media/mica ratio | Water content, cc. | Recovery −325 mesh, percent | Grinding efficiency, lb./HP hr. As ground | Grinding efficiency, lb./HP hr. Corrected to equal volume | Recirculating load in percent |
|---|---|---|---|---|---|---|
| S2-1 | 7.4/1 | 212 | 67.2 | 8.9 | 18.9 | 49 |
| S3-1 | 6/1 | 175 | 60.0 | 7.9 | 20.3 | 67 |
| S4-1 | 4/1 | 180 | 57.6 | 11.3 | 27.2 | 75 |
| S5-1 | 3/1 | 200 | 47.6 | 12.6 | 27.3 | 110 |
| S6 | 2.1/1 | 265 | 36.8 | 13.7 | 23.2 | 164 |
| S7 | 1.5/1 | 325 | 28.1 | 14.8 | 20.5 | 257 |
| S8 | 1/1 | 450 | 22.9 | 18.9 | 18.9 | 336 |
| S9 | 0 | 340 | 15.3 | 12.1 | 16.0 | 550 |

These data show conclusively that the addition of grinding media to the charge greatly improved: the recovery of minus 325 mesh mica; the grinding efficiency; and was very effective in reducing the amount of unground mica in the recirculating load. Mica due to its accentuated platy shape is difficult to handle in conventional mineral dressing equipment. However, sand, or sand-sized particles are easily separated, dewatered and returned to the grinding apparatus using conventional classifying apparatus. The recirculating load of total solids is more or less uniform, except in the case of very high and very low media/mica ratios. The mica content of the recirculating load is rapidly reduced as the media/mica ratio increases.

Samples S4–1 and S5–1 illustrate the optimum range of media/mica ratio for the New Mexico sericite. The optimum ratio for another micaceous material may very well vary slightly as compared with sericite, but most likely will fall close to the range of 3 to 4 parts media to 1 part mica. This can be easily determined by controlled testing in accordance with the disclosure.

Example 5

Water requirements according to the process may vary widely with respect to the size and physical characteristics of the mica feed particles. Initially the mica particles occupy the voids between particles of grinding media or are too large to fit into these interstices and have the effect of expanding the volume of the solid. With the initiation of grinding forces, unbalancing changes within the system occur very rapidly. The mica particles disintegrate rapidly, and tend to occupy the void spaces in and among the grinding media rather than expand the volume of the solid components. This has the effect of making the system more fluid as initially water occupied these void spaces. The magnitude of this effect on the water content of the system varies widely but two properties of the mica have a marked effect—particle size and bulk density. In general, the coarser the mica and the lower its bulk density, the greater the initial requirements of water, immediately followed by the larger the amount of excess water resulting shortly after grinding is initiated.

To illustrate these effects, several micas having a wide range of particle size distribution and bulk density variation were tested under controlled conditions. The procedure and apparatus used was the same as used in Example 1. The materials used in these tests were sericite from New Mexico, hard muscovites from the Black Hills, North Dakota, and Alabama, weathered muscovites from North Carolina and soft muscovites from Connecticut. The effect of the particle size and bulk density of the mica on water requirements may be seen in the following data.

TABLE I

| Sample No. | Size distribution | Bulk density | Media [2] Wgt., gram | Media [2] Vol., percent | Mica Wgt., gram | Mica Vol., percent | Water Wgt., gram | Water Vol., percent |
|---|---|---|---|---|---|---|---|---|
| M1–1 [1] | 5 to 20 mesh | 0.3 | 750 | 46.1 | 125 | 7.3 | 270 | 46.6 |
| M1–1A | | | 750 | 55.1 | 125 | 8.7 | 185 | 36.2 |
| S10–1 [1] | –20 mesh | 0.9 | 750 | 52.6 | 125 | 8.2 | 210 | 39.2 |
| S10–1A | | | 750 | 56.3 | 125 | 8.9 | 175 | 34.8 |
| S11–1 [1] | –20 mesh | 0.9 | 910 | 51.6 | 150 | 8.6 | 250 | 39.8 |
| S11–1A | | | 910 | 49.0 | 250 | 13.4 | 250 | 37.6 |
| WG1 [1] | –14 microns | | 750 | 60.0 | 125 | 10.8 | 135 | 29.2 |
| S5–2 | –20 mesh | 0.9 | 750 | 45.4 | 250 | 14.4 | 250 | 40.2 |
| C2 | 10 to 100 mesh | 0.5 | 750 | 42.0 | 250 | 13.2 | 300 | 44.8 |
| K1 | 8 to 100 mesh | 0.6 | 750 | 43.7 | 250 | 13.8 | 275 | 42.5 |
| BW3 | ¾″ to 20 mesh | 0.7 | 740 | 39.7 | 250 | 12.6 | 340 | 47.7 |

[1] Tests run for two minutes, then liquid extracted or solids added and test continued for three minutes.
[2] 20 to 48 mesh Ottawa sand.

It will be noted from Table I that in two cases (M1–1A and S10–1A) excess water was removed after two minutes initial grinding. In one case (S11–1A) viscosity was adjusted by adding mica. In all cases such adjustments restored the grinding slurry to optimum conditions to the end of the run. The data on WG1 is included to show that where the feed particle size is so small as to fill the voids among the grinding media no viscosity adjustment was necessary. The other examples illustrate the effect of particle size and bulk density variations on the initial requirement for water. The addition of grinding media is also an effective means of making viscosity adjustment, in fact this method has been found to be more practical than adding mica or removing water.

Example 6

Comparative tests were run to evaluate the relative merits of a variety of grinding media and to evaluate the effect of the shape, density, and size distribution of the media on the recovery and size distribution of the ground mica. The media used in these tests were Ottawa quartz sand, Lexan (a plastic polycarbonate), and Zytel nylon. Not only did each of these media vary in specific gravity—2.65, 1.2, and 1.15, respectively—but also in size and shape—respectively, spheres 20 to 48 mesh, cylinders ⅒″ diameter x ⅛″, and blocks 0.15″ x 0.125″ x 0.08″. All tests were run using the apparatus and procedure described in Example 1. The micas used in these tests were hard muscovite from Alabama and soft or weathered muscovite from Connecticut. The grinding compositions and results of these tests are as follows:

TABLE J

| Sample [1] No. | Media [2] Wgt., grams | Media [2] Vol., percent | Mica Wgt., grams | Mica Vol., percent | Water Vol., cc. | Water Vol., percent | Recovery, percent finer than— 14 mesh | 100 mesh | 200 mesh | 325 mesh |
|---|---|---|---|---|---|---|---|---|---|---|
| BW1–1 | 900 Q | 44.6 | 200 | 9.4 | 350 | 46.0 | 84.2 | 63.5 | 48.5 | 35.6 |
| BW1–2 | 470 L | 44.1 | 200 | 8.1 | 425 | 47.8 | 99+ | 61.7 | 39.2 | 26.1 |
| BW1–3 | 450 N | 45.9 | 200 | 8.3 | 390 | 45.8 | 99+ | 59.9 | 37.9 | 24.1 |
| BW1–4 | 200 N, 23.7; 400 Q, 20.6 | 44.3 | 200 | 9.7 | 340 | 46.0 | 99+ | 69.2 | 49.6 | 35.1 |
| BW2–1 | 900 Q | 47.1 | 200 | 9.9 | 310 | 43.0 | 100 | 90.3 | 71.2 | 46.6 |
| BW2–2 | 400 L | 46.6 | 200 | 10.0 | 310 | 43.4 | 100 | 90.2 | 62.0 | 32.7 |
| C1 | 350 L | | 250 | | 300 | | [3] 95.4 | 80.5 | 54.0 | 38.5 |
| C2 | 750 Q | | 250 | | 300 | | [3] 87.9 | 80.3 | 62.9 | 49.9 |

[1] BW1–¾″ to 20 mesh muscovite; BW2–35 to 200 mesh wet ground mica; C 10 to 100 mesh muscovite.
[2] Q—20 to 48 mesh quartz; L—Lexan polycarbonate 1/10″ d. x ⅛″; N—nylon 0.125 x 1.5 x 0.08″.
[3] 35 mesh rather than 14 mesh.

These data indicated that the particle size distribution of the grinding media had a much greater effect on size reduction of the mica than did either the density or shape of the media. The quartz sand media (sample BW1–1) produced a higher percentage of minus 325 mesh mica but left a considerably greater amount of unground mica than did either the Lexan or nylon (samples BW1–2 and BW1–3). However, a mixture of quartz and nylon (sample BW1–4) was most effective in grinding the mica. Samples BW2–1 and BW2–2 further illustrated that the finer-grained media produced a product having a finer mica particle size distribution. Similar effects were noted from the tests conducted on the Connecticut muscovite (samples C1 and C2) to that of a similarly sized quartz media. In all probability this is due to the fact that this system requires solid particles of the slurry be in intimate contact at all times. Size reduction is due to shearing forces rather than percussive forces in which case hardness and density would be controlling factors. The advantages from being able to use a plastic media are obvious: (1) it is nonabrasive and does not scratch or mar the surface of the mica, (2) equipment life would be greatly extended, and (3) horsepower requirements would be reduced due to the decreased weight of the grinding media. Another potential advantage which has not been completely explored is the fact that the plastic media tends to float on the ground mica slurry, a property that will facilitate classification.

Example 7

To evaluate this method as a means of continuously grinding mica, an apparatus as shown in FIGURES 1–4 was constructed and operated. The purpose of these tests was to evaluate the grinding characteristics and transfer properties of the slurry through the cell as well as to prepare large samples for evaluation.

The most convenient operating procedure was to fill both the upper and lower disintegration chambers 20, 22 in the manner described in Example 1 with impellers rotating at minimal r.p.m. As soon as both chambers were charged the peripheral speed of the impeller blades was increased to approximately 2000 f.p.m. When the slurries, thus introduced, started to increase in fluidity, new feed composed of media and mica and the necessary amount of water to maintain fluidity was introduced to the upper disintegration chamber 22, the valve 32 connecting between the two chambers was opened, and the partially ground slurry discharged into the lower disintegration chamber 20 at a rate equal to the introduction of new feed. The completely ground slurry comprising both the media and mica, overflowed from the lower chamber 20 through outlet 30 and was collected. During continuous operation, it was necessary to adjust the viscosity of the slurry in the lower chamber 20 because it became too fluid for efficient grinding. This was accomplished by adding additional media to the lower chamber 20 through auxiliary inlet 25.

Conditions similar to those observed in the small grinder of FIGURE 5 were readily obtained and the ground mica was similar in appearance and properties. Material transfer from the upper to the lower cell was accomplished without difficulty, indicating that the high viscosity necessary for efficient grinding could be maintained. Several micas, varying widely in size distribution and physical properties, were successfully ground using the two-stage apparatus. These included the Gusher Knob and Kaolin muscovites from North Carolina, the Black Warrior mica from Alabama, mine scrap, and shop scrap mica from India. Some of the shop scrap exceeded 6″ in plate dimensions, and although this material was difficult to feed into the grinder, it was easily digested and disintegrated. Runs with either quartz sand or Lexan polycarbonate grinding medias were made. As in the small grinder of FIGURE 5, the coarser media more effectively ground the coarse mica particles, but the finer media produced mica having a finer particle size distribution. Typical grinding compositions are shown as follows:

TABLE K

| Sample No. | Media volume, percent | Mica volume, percent | Water volume, percent |
|---|---|---|---|
| G-O | 51.0 | 9.6 | 39.3 |
| K-O | 51.0 | 9.6 | 39.3 |
| BW-O | 47.8 | 9.1 | 43.1 |

Good initial fluid flow was maintained by feeding only about 80 percent of the grinding media with the feed into the upper vessel of the apparatus. The balance of the media was introduced into the lower vessel after agitation had been initiated and served to counteract and adjust for increased fluidity due to the breakdown of the mica particles.

The ground products had appearance and characteristics equivalent to those of commercial wet-ground mica, prepared by the muller process and were equivalent in every respect to those produced in the small scale batch grinding tests. Recovery and grinding efficiency were also comparable, conclusively indicating that this method is adaptable to continuous grinding.

Example 8

A compaartive evaluation of a mica ground by this process and one ground by the muller process was made by including these materials in a paint film. A hard muscovite mica from eastern Washington, ground in accordance with this process, was compared to a standard wet-ground material used in the paint industry. The material prepared by viscous-shear milling, was found to be whiter, brighter, and finer in particle size distribution, and to have lower viscosity in the paint film, as compared with the standard mica. Although this may not be conclusive since the materials compared were not from the same source, it indicates beyond any reasonable doubt that viscous-shear milling produces a wet-ground mica at least equivalent to that produced by the old muller process.

Example 9

Testing has indicated that, in addition, to continuously wet-grinding mica concentrates, nonpercussive viscous-shear milling may be used in the direct production of a wet-ground mica product from a crushed micaceous ore. Since many natural ores such as mica schists, consist primarily of quartz and mica, and this process utilizes the difference in physical properties between a media, one of which may be quartz, and mica to produce disintegration, the ore may be wet-ground without first having to prepare a mica concentrate. The only preparation required to produce mill feed is crushing to reduce the size of the quartz to approximately ⅛ inch. The advantages of such an application would be twofold: substantial cost reduction in the preparation of mill feed; and a vast expansion of the natural resources that can be utilized for the production of wet-ground mica.

Two materials were used in the tests to evaluate this potential application. One was a weathered quartz-mica schist composed of approximately equal parts of biotite, muscovite, and quartz from Chelan County, Washington. This material was prepared for wet-grinding by crushing to pass 14 mesh and discarding the material minus 150 mesh which was primarily clay. The second material was a sand trap tailings produced from a mica wet-grinding plant using the muller process. This tailing produce contained about 45 percent mica in various stages of wet-grinding and about 55 percent sand composed of about equal parts quartz and feldspar. The apparatus and procedure used was similar to that described in Example 1. The grinding compositions used are as follows:

TABLE L

| Sample No. | Ore wgt. | Media [1] | | Mica | | Water | |
|---|---|---|---|---|---|---|---|
| | | Wgt. | Vol., percent | Wgt. | Vol., percent | Vol., cc. | Vol., percent |
| MS-1 | 400 | 133 | | 267 | | | |
| | | 600 | | | | | |
| | | 733 | 46.0 | 267 | 15.8 | 230 | 38.2 |
| STT-1 | 500 | 275 | | 225 | | | |
| | | 500 | | | | | |
| | | 775 | 47.6 | 225 | 13.6 | 230 | 38.8 |

[1] Extra media added was 20 to 48 mesh Ottawa sand.

The recovery of minus 325 mesh mica product from the schist sample was 45 percent of the total sample, or 70 percent of the available mica. A greater percentage of the mica would have been recovered had the sample not been so highly weathered. Most of the mica lost was in the form of colloidal fines. As expected, the color of the wet-ground product from this sample was too dark to meet paint specifications; however, it had all of the other characteristics of wet-ground mica and could be used in an application where color is not critical.

Of the mica in the sand trap tailings sample, 41 percent of the total feed comprising 91 percent of the total mica was recovered as mica products minus 100 mesh. This wet-ground mica was equal in every respect to the wet-ground mica currently being produced at plant where the tailings were obtained.

These two examples clearly illustrate that the method of this disclosure has application greater in scope than simply grinding mica concentrates. In addition to the grinding of micaceous materials, preliminary tests have indicated that nonpercussive viscous-shear milling can be used to wet-grind a wide variety of minerals including talc, kaolinite, and pyrophyllite. These materials were readily ground finer than 325 mesh, and settling rates indicated that a considerable portion of the material was finer than 4 microns.

Figure 6:
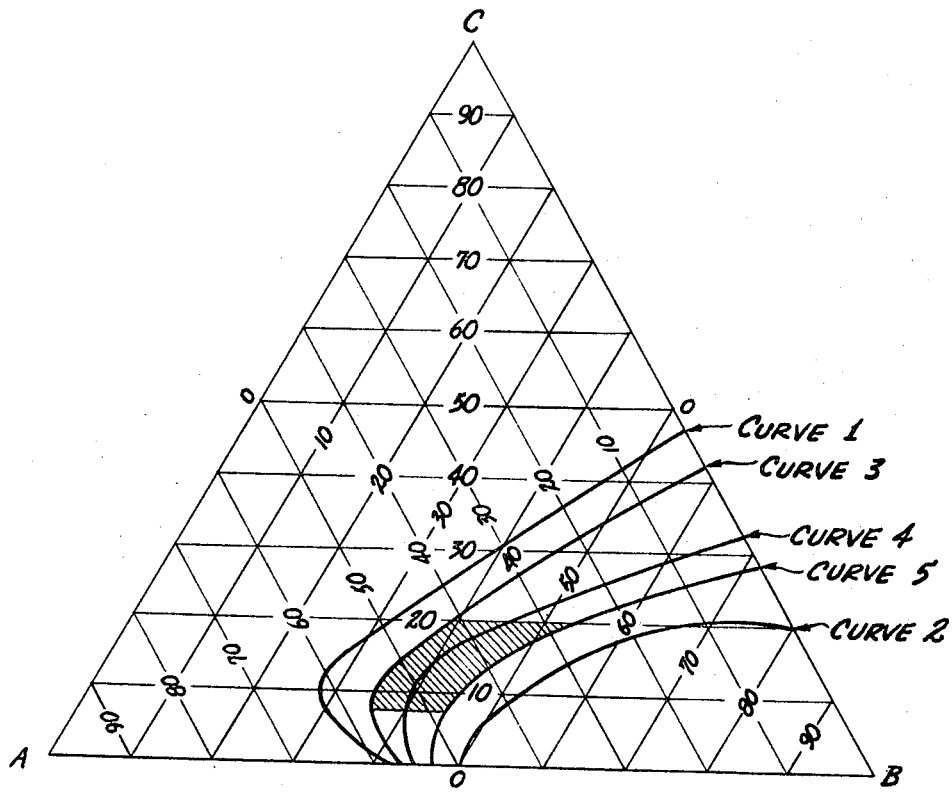
FIGURE 6 is a three-component graphic representation of a range of mica-media-water slurry compositions showing the upper and lower limits within which this invention operates, and illustrating by a family of curves narrower operating conditions for a given mica component.

In FIGURE 6 a graphic representation is presented to show the upper and lower limits and preferable ranges of the three components in the slurry under treatment.

Curve 1 in FIGURE 6 shows the lower limit of water content that will allow fluid flo, and was determined on material minus 325 mesh in particle size all of which would fill void space between particles of grinding media. Curve 2 shows the upper limit of water at which the slurry will retain its non-segregating characteristics, and was determined on material ¾ to ½″ in particle size, none of which would occupy void space between particles of grinding media.

For a given material, the most desirable water content for continuous grinding (curve 4) as well as the upper (curve 5) and lower (curve 3) limits of water content are a family of the three curves falling entirely within the area defined by curves 1 and 2. In the example shown the material was 20 to 325 mesh sericite mica. The shaded area embracing portions of curves 3 and 5 was found to be the most desirable for said sericite. For other micaceous materials the defined areas will vary slightly due to the different properties or characteristics of micas.

By means of this process it is possible to produce a wet-ground mica product of acceptable particle size having the desired sheen, slip, unctuousness, lubricity, particle size and high hydrophilic properties useful for light transmitting and light reflecting uses as in coatings, as an additive to lubricants, for a parting agent in molding operations, and in dielectric applications, to name a few. In addition to being practiced batchwise, the process provides continuousness of operation, may be carried out in simple apparatus operated by relatively unskilled persons, provides high grinding efficiency and therefore is economical. This improvement in the process of producing wet-ground mica is noteworthy improvement in and valuable contribution to the art and is of great economic importance.

This disclosure directed to those skilled in the art will quite naturally stimulate the adoption of variations and modifications. Such, for example, may relate to design features of the apparatus while others may be variations in proportions and ratios of the various components. This invention is to be considered in the true light of its breadth as a valuable technological development and is to be accorded an interpretation commensurate therewith, having due regard to a liberal application of the doctrine of equivalents, within the spirit and scope of the following claims.

What is claimed is:
1. The method of grinding mica solids, comprising:
  A. forming a three-component, viscous slurry of mica solids, granular grinding media and water in which there is
    +7% to 30% micaceous material,
    +0% to 20% grinding media by volume, and
    +sufficient water to produce fluid flow;
  B. feeding slurry to and vigorously agitating the same in a disintegrating zone;
  C. maintaining said slurry in said disintegrating zone at such low fluidity and such high viscosity that the components are fully commingled and nonsegregating throughout said disintegrating zone;
  D. by said agitation, subjecting the mica solids content of the slurry to the forces of viscous shear, including flexure, attrition, and high energy frictional rubbing between and among the solids components while, by reason of the high viscosity of said slurry, avoiding the application of substantial percussive forces on the mica particles; and
  E. withdrawing said slurry from said disintegrating zone after a predetermined time under agitation.
2. The method according to claim 1 in which the micaceous material is selected from the group consisting of sericite mica and muscovite mica.
3. The method according to claim 1 in which the slurry comprises a sericite mica and the slurry in said disintegrating zone is maintained at between about 33 volume percent and 45 volume percent water while in said disintegrating zone.
4. The method according to claim 1 in which the slurry comprises a sericite mica between about 7 percent and about 20 percent by volume and the grinding media is a quartz sand between about 55 percent and about 40 percent by volume.
5. The method according to claim 1 in which the slurry comprises a muscovite mica between about 7 percent and about 25 percent by volume and the grinding media is a quartz sand between about 50 percent and about 20 percent by volume.
6. The continuous method of grinding mica solids, comprising:
  A. forming a three-component, viscous slurry of mica solids, granular grinding media and water in which there is
+ 7% to 30% micaceous material,
+ 60% to 20% grinding media by volume, and
+ sufficient water to produce fluid flow;

B. continuously feeding slurry to and vigorously agitating the same in a disintegrating zone while continuously circulating all three slurry components through said zone;

C. maintaining said slurry in said disintegrating zone at such low fluidity and such high viscosity that the components are fully commingled and nonsegregating throughout said disintegrating zone;

D. by said agitation, subjecting the mica solids content of the slurry to the forces of viscous shear including flexure, attrition and high energy frictional rubbing between and among the solids components while, by reason of the high viscosity of said slurry, avoiding the application of substantial percussive forces on the mica particles; and E. continuously withdrawing a portion of said slurry at such rate that the retention time of the slurry in said disintegrating zone is for a predetermined time.

7. The continuous method according to claim 6 in which the micaceous material is selected from the group consisting of sericite and muscovite micas.

8. The continuous method according to claim 6 in which the withdrawn slurry material is separated into fractions and that coarser than about minus 325 mesh is recycled into said disintegrating zone.

9. The continuous method according to claim 6 in which the micaceous material is a sericite mica.

10. The continuous method according to claim 6 in which the disintegrating zone is divided and the divisions are arranged in sequential communication and the step of maintaining the slurry at low fluidity and high viscosity is accomplished by adding solids components to the slurry in the following of said disintegrating zone divisions.

11. The method according to claim 6 in which the slurry comprises a muscovite mica and the slurry in said disintegrating zone is maintained at between about 30 volume percent and 60 volume percent water while in said disintegrating zone.

References Cited

UNITED STATES PATENTS

| | | | |
|---|---|---|---|
| 2,482,740 | 9/1949 | Brown | 241—21 |
| 2,498,111 | 2/1950 | Mattson | 241—29 |
| 2,798,673 | 7/1957 | Kunz et al. | 241—21 |
| 2,833,482 | 5/1958 | Weston et al. | 241—15 |
| 2,914,107 | 11/1959 | Gaines | 241—21 |
| 3,162,379 | 12/1964 | Cohn et al. | 241—21 |

GERALD A. DOST, *Primary Examiner.*

U.S. Cl. X.R.

241—43, 46, 153